United States Patent
Ripley (10) Patent No.: US 9,678,528 B2
(45) Date of Patent: Jun. 13, 2017

(54) VOLTAGE SUPPLY SYSTEM WITH BOOST CONVERTER AND CHARGE PUMP

(71) Applicant: SKYWORKS SOLUTIONS, INC., Woburn, MA (US)

(72) Inventor: David Steven Ripley, Marion, IA (US)

(73) Assignee: Skyworks, Solutions Inc., Woburn, MA (US)

( * ) Notice: Subject to any disclaimer, the term of this patent is extended or adjusted under 35 U.S.C. 154(b) by 0 days.

(21) Appl. No.: 14/867,186

(22) Filed: Sep. 28, 2015

(65) Prior Publication Data

US 2016/0239040 A1 Aug. 18, 2016

Related U.S. Application Data

(60) Provisional application No. 62/116,458, filed on Feb. 15, 2015.

(51) Int. Cl.
  *G05F 5/00* (2006.01)
  *H04B 1/40* (2015.01)

(52) U.S. Cl.
  CPC ...... *G05F 5/00* (2013.01); *H04B 1/40* (2013.01)

(58) Field of Classification Search
  CPC .................................................. H04W 52/0209
  USPC .................... 455/73, 524; 323/282; 363/60
  See application file for complete search history.

(56) References Cited

U.S. PATENT DOCUMENTS

| 7,777,459 B2 | 8/2010 | Williams |
| 8,725,085 B2 | 5/2014 | Darabi et al. |
| 2010/0211132 A1 | 8/2010 | Nimmagadda et al. |
| 2010/0277156 A1 | 11/2010 | Schlaffer-Zannoth |
| 2014/0057684 A1* | 2/2014 | Khlat ............... H04W 52/0209 455/574 |
| 2014/0210437 A1 | 7/2014 | Chen |
| 2014/0268946 A1* | 9/2014 | Liu ........................ H02M 3/07 363/60 |
| 2015/0145497 A1* | 5/2015 | Torres .................. H02M 3/158 323/283 |
| 2016/0056714 A1* | 2/2016 | Ek ........................ H02M 3/07 323/271 |

* cited by examiner

Primary Examiner — Ping Hsieh
(74) Attorney, Agent, or Firm — Chang & Hale LLP (57) ABSTRACT

Voltage supply system with boost converter and charge pump. A voltage supply system can include a boost converter controllable to receive an input voltage at an input node and generate an output voltage when the output voltage is greater than or equal to the input voltage. The voltage supply system can include a charge pump controllable to receive the input voltage at the input node and generate the output voltage when the output voltage is less than the input voltage. The voltage supply system can further include a controller configured to receive a control signal and control the boost converter or the charge pump to generate the output voltage at an output node based on the control signal.

20 Claims, 9 Drawing Sheets

VOLTAGE SUPPLY SYSTEM WITH BOOST CONVERTER AND CHARGE PUMP

CROSS-REFERENCE TO RELATED APPLICATION(S)

This application claims priority to U.S. Provisional Application No. 62/116,458 filed Feb. 15, 2015, entitled DEVICES AND METHODS RELATED TO MULTI-MODE POWER MANAGEMENT, the disclosure of which is hereby expressly incorporated by reference herein in its entirety.

BACKGROUND

Field

The present disclosure generally relates to voltage supply systems.

Description of the Related Art

A power amplification system can be powered by a voltage supply system that provides a supply voltage (derived from a battery voltage). The supply voltage can be varied to reduce the amount of power used by the power amplifier. Ideally, a power amplifier supply voltage should follow the average output power over, for example, a 20 dB window from roughly 10 volts (V) down to 1 V. Given a nominal battery voltage (Vbatt) of approximately 3.8 V, a boost function can be utilized to generate a supply voltage greater than Vbatt, and a buck function can be utilized to generate a supply voltage less than Vbatt.

SUMMARY

In accordance with some implementations, the present disclosure relates to a voltage supply system. The voltage supply system includes a boost converter controllable to receive an input voltage at an input node and generate an output voltage when the output voltage is greater than or equal to the input voltage. The voltage supply system includes a charge pump controllable to receive the input voltage at the input node and generate the output voltage when the output voltage is less than the input voltage. The voltage supply system includes a controller configured to receive a control signal and control the boost converter or the charge pump to generate the output voltage at an output node based on the control signal.

In some embodiments, in response to the control signal indicating a first mode, the controller can be configured to control the charge pump to generate the output voltage less than the input voltage. In some embodiments, in response to the control signal indicating the first mode, the controller can be configured to control the charge pump to generate the output voltage of approximately half the input voltage. In some embodiments, in response to the control signal indicating the first mode, the controller can be configured to control a charge pump bypass circuit to pass the output voltage to the output node.

In some embodiments, in response to the control signal indicating a second mode, the controller can be configured to control the boost converter to generate the output voltage equal to the input voltage. In some embodiments, in response to the control signal indicating the second mode, the controller can be configured to operate one or more switches of the boost converter to pass the input voltage as the output voltage to the output node.

In some embodiments, in response to the control signal indicating a third mode, the controller can be configured to control the boost converter to generate the output voltage greater than the input voltage. In some embodiments, in response to the control signal indicating the third mode, the controller can be configured to periodically operate one or more switches of the boost converter to boost the input voltage to generate the output voltage at the output node.

In some embodiments, the boost converter can include an inductor and one or more switches. In some embodiments, the one or more switches can include a first switch coupled between the inductor and a ground voltage and a second switch coupled between the inductor and the output node. In some embodiments, the boost converter does not include a switch coupled between the inductor and the input node.

In some embodiments, in response to the control signal indicating a second mode, the controller can be configured to open the first switch and close the second switch to pass the input voltage as the output voltage to the output node. In some embodiments, in response to the control signal indicating a third mode, the controller can be configured to periodically open and close the first switch and second switch to boost the input voltage to generate the output voltage at the output node.

In some embodiments, the charge pump can include one or more capacitors. In some embodiments, the charge pump does not include an inductor.

In some embodiments, the input voltage can be substantially equal to a battery voltage.

In some implementations, the present disclosure relates to a radio-frequency (RF) module including a packaging substrate configured to receive a plurality of components. The RF module includes a voltage supply system implemented on the packaging substrate. The voltage supply system includes a boost converter controllable to receive an input voltage at an input node and generate an output voltage when the output voltage is greater than or equal to the input voltage. The voltage supply system includes a charge pump controllable to receive the input voltage at the input node and generate the output voltage when the output voltage is less than the input voltage. The voltage supply system includes a controller configured to control the boost converter or the charge pump to generate the output voltage at an output node based on a received control signal.

In some embodiments, the RF module can be a front-end module (FEM).

In some embodiments, the voltage supply system can include a supply device and one or more passive devices external to and electrically connected to the supply device.

In some implementations, the present disclosure relates to a wireless device including a transceiver configured to generate a radio-frequency (RF) signal. The wireless device includes a front-end module (FEM) in communication with the transceiver. The FEM includes a packaging substrate configured to receive a plurality of components. The FEM includes a power amplification system implemented on the packaging substrate and configured to amplify the RF signal. The power amplification system includes a voltage supply system. The voltage supply system includes a boost converter controllable to receive an input voltage at an input node and generate an output voltage when the output voltage is greater than or equal to the input voltage. The voltage supply system includes a charge pump controllable to receive the input voltage at the input node and generate the output voltage when the output voltage is less than the input voltage. The voltage supply system includes a controller configured to control the boost converter or the charge pump to generate the output voltage at an output node based on a received control signal. The wireless device includes an antenna in communication with the FEM. The antenna is configured to transmit the amplified RF signal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
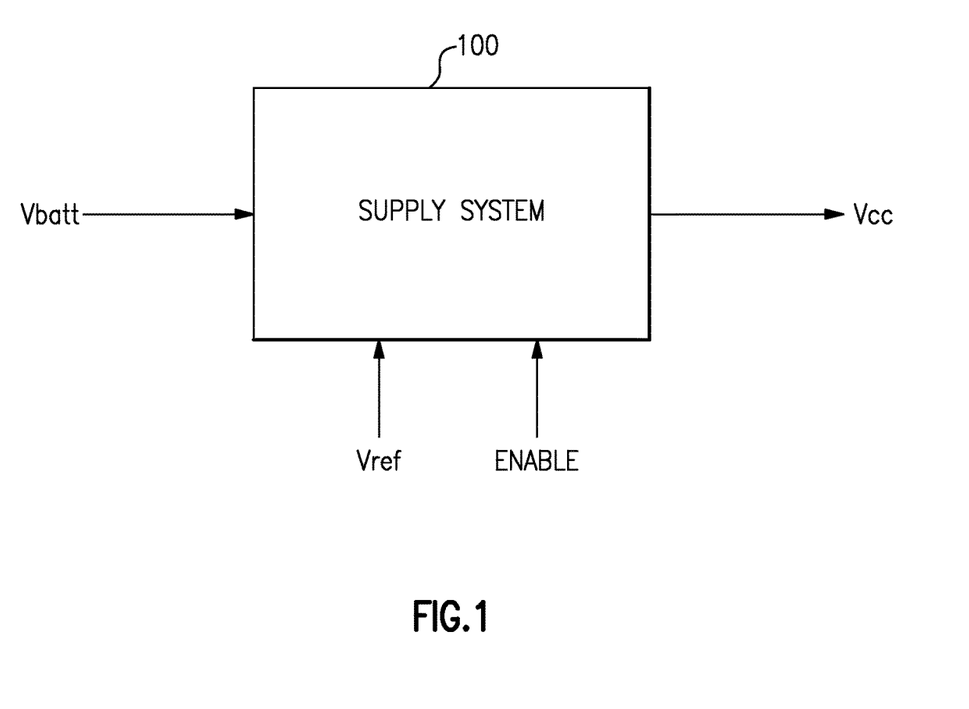
FIG. 1 illustrates a block diagram of a voltage supply system having one or more features as described herein.

FIG. 1 illustrates a block diagram of a voltage supply system 100 having one or more features as described herein. The voltage supply system 100 can generate one or more output voltages, e.g. a supply voltage (Vcc), from an input voltage, e.g., from a battery (Vbatt). The voltage supply system 100 can receive the input voltage at an input terminal and supply the output voltage at an output terminal. The voltage supply system 100 can further include an enable terminal for receiving an enabling signal and a reference terminal for receiving a reference voltage (Vref) or a signal indicative of a reference voltage that indicates how the input voltage is to be converted into the output voltage. In particular, whereas the input voltage may be relatively fixed, output voltage can be based on the reference voltage.

In some applications, the voltage supply system 100 of FIG. 1 can be utilized to provide power amplifier (PA) supply voltages in portable electronic devices such as wireless devices. Although various examples are described in such a context, it will be understood that one or more features of the present disclosure can also be utilized in other applications.

Ideally, a PA supply voltage should follow the average output power over, for example, a 20 dB window from roughly 10 V (volts) down to 1 V. Given a nominal battery voltage (Vbatt) of approximately 3.8 V, a boost function (as performed by a boost converter) can be utilized to generate a supply voltage greater than Vbatt, and a buck function (as performed by a buck converter) can be utilized to generate a supply voltage less than Vbatt.

In some PA applications, an important performance parameter is a system current drain at high output power (e.g., at a supply voltage of approximately 9.5 V). Accordingly, boost efficiency is an important design consideration. A buck-boost converter architecture typically degrades boost efficiency by about 3-5 points, and is considered to be unacceptable in some PA applications.

Described herein are devices and methods related to a multi-mode power management, in which a boost converter can be configured and utilized for a high-power range, a bypass circuit can be configured and utilized for a mid-power range, and a charge pump (e.g., including an output of Vbatt/2) can be configured and utilized for a low-power range. As described herein, such a multi-mode power management system can deliver acceptable performance over substantially the entire dynamic range with few components (e.g., one capacitor as opposed to one inductor in a buck converter for low-power range) in the system's bill of materials (BOM).

Figure 2:
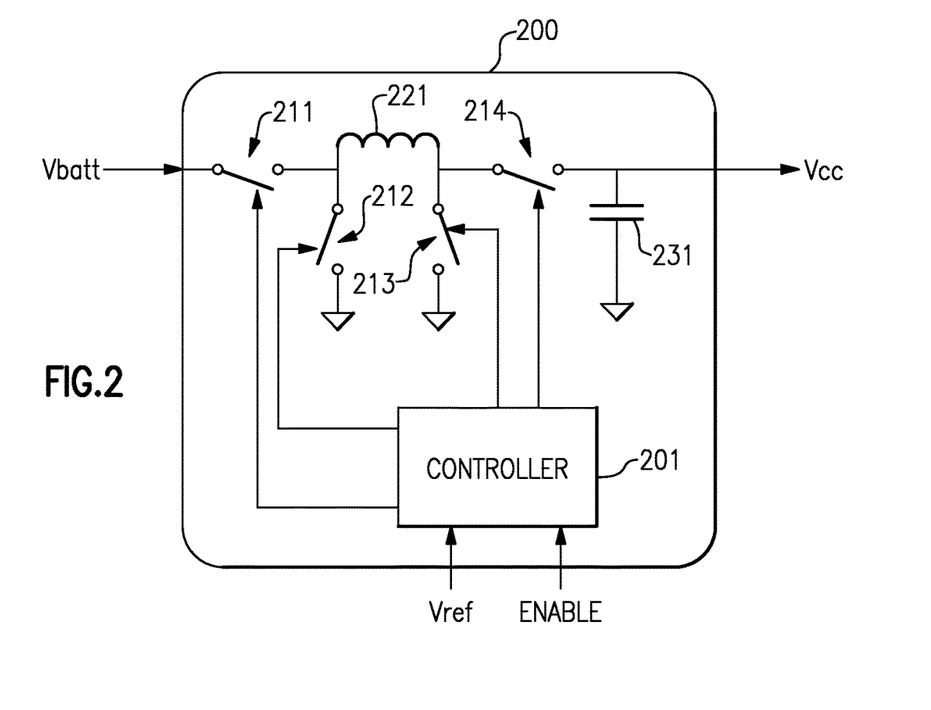
FIG. 2 illustrates a circuit diagram of example buck-boost converter.

FIG. 2 illustrates a circuit diagram of example buck-boost converter 200. As is generally understood, controlled (e.g., by a controller 201) operations of switches 211-214 can result in accumulation and transfer of energy associated with an inductor 221 and a capacitor 231. Such operations can result in an output voltage (Vcc) at an output node that is greater or less than an input voltage (Vbatt) received at an input node. For example, Vbatt can be in a range of 2.5 V to 4.8 V, and Vcc can be in a range of 1.2 V to 11 V.

In the buck-boost converter 200 of FIG. 2, a first switch 211 is coupled between the input node and the inductor 211, and can be used to provide the buck functionality in which the output voltage is less than the input voltage. However, the first switch 211 can introduce loss which, in turn, degrades the performance of the boost functionality in which the output voltage is greater than the input voltage.

Figure 3:
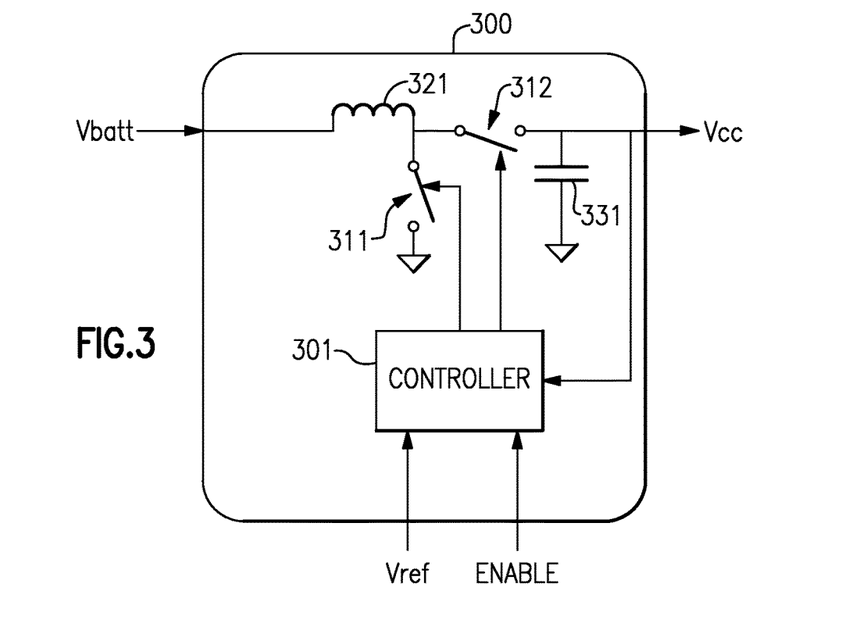
FIG. 3 illustrates a circuit diagram of an example optimized boost converter.

FIG. 3 illustrates a circuit diagram of an example optimized boost converter 300. Controlled (e.g., by a controller 301) operations of switches 311-312 can result in accumulation and transfer of energy associated with an inductor 321 and a capacitor 331. Such operations can result in an output voltage (Vcc) at an output node that is greater than the input voltage (Vbatt) received at the input node. For example, Vbatt can be in a range of 2.5 V to 4.8 V, and Vout can be around 10 V. In the optimized boost converter 300, feedback from the output to the controller 301 can be implemented to regulate the output voltage at a desired value.

Thus, unlike the buck-boost converter 200 of FIG. 2, the optimized boost converter 300 of FIG. 3 does not include a switch coupled between the inductor 321 and the input node. However, the optimized boost converter 300 of FIG. 3 typically does not support output voltages less than the input voltage.

The optimized boost converter 300 of FIG. 3 can be controller (e.g., by the controller 301) to provide bypass functionality. Whereas operations of switches 311-312 can result in accumulation and transfer of energy associated with the inductor 321 and the capacitor 331 to provide a boost functionality, opening the first switch 311 and closing the second switch 312 can provide a bypass functionality in which the output voltage (Vcc) is approximately equal to the input voltage (Vbatt).

Figure 4:
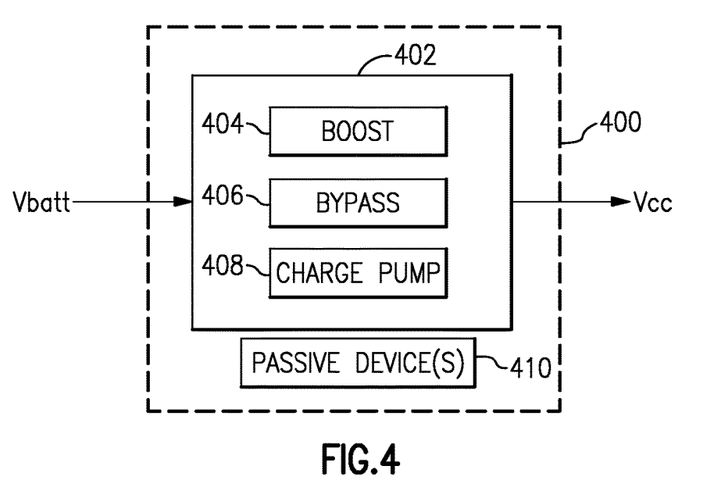
FIG. 4 illustrates a block diagram of a voltage supply system for multi-mode power management.

FIG. 4 illustrates a block diagram of a voltage supply system 400 for multi-mode power management. The voltage supply system receives an input voltage (Vbatt) at an input node and supplies an output voltage (Vcc) at an output node. The voltage supply system 400 includes a supply device 402 (e.g., a die or a module) having boost circuitry 404 to generate an output voltage greater than the input voltage, bypass circuitry 406 to pass the input voltage as the output voltage, and charge pump circuitry 408 to generate an output voltage less than the input voltage.

The voltage supply system 400 further includes one or more passive devices 410 (e.g., capacitors and/or inductors) that can facilitate the various functionalities associated with the supply device 400. In some embodiments, the passive device(s) can be external to and electrically connected to the supply device. As an example, the boost circuitry 404, an inductor of the passive devices 410, and a capacitor of the passive devices 410 can form a boost converter such as the optimized boost converter 300 of FIG. 3. As another example, the charge pump circuitry 408 and one or more capacitors of the passive devices 410 can form a charge pump.

In some implementations, the boost circuitry 404 and the bypass circuitry 406 include at least some of the same components. In particular, as described further below, the boost circuitry and the bypass circuitry can both include the same two switches that are configurable to provide either boost functionality or bypass functionality.

In the example of FIG. 4 (and throughout this disclosure), the input voltage is indicated as being provided by a battery (Vbatt). However, it will be understood that one or more features of the present disclosure can also be implemented in systems where the input is from a source other than a battery.

Figure 5:
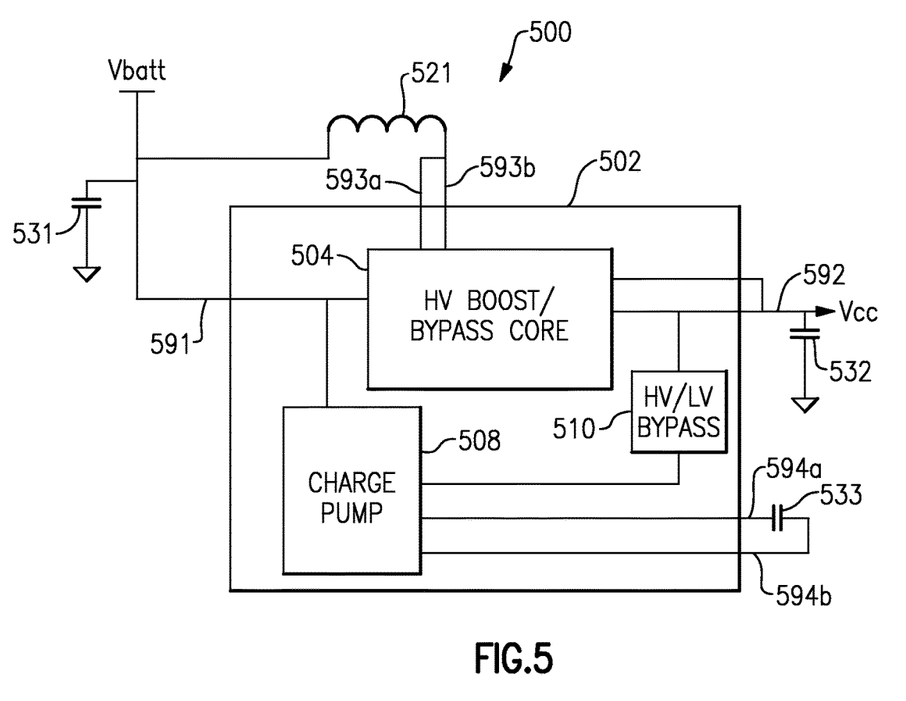
FIG. 5 illustrates a voltage supply system including a boost converter and a charge pump.

FIG. 5 illustrates a voltage supply system 500 including a boost converter and a charge pump. The voltage supply system includes a supply device 502 (e.g., a die or a module) an input node 591 to receive an input voltage (Vbatt) and an output node 592 to supply an output voltage (Vcc). The input node is coupled to a ground voltage via a first capacitor 531 that shunts variations in the input voltage. The output node 592 is coupled to the ground voltage via a second capacitor 532 that shunts variations in the output voltage and implements a capacitor of a boost converter.

The supply device 502 includes two switching nodes 593a-593b coupled, via an inductor 521, to the input voltage. The inductor 521 implements an inductor of the boost converter. The supply device 502 includes two charge pump nodes 594a-594b coupled together via a third capacitor 532 that implements a capacitor of a charge pump.

The supply device 502 includes boost converter circuitry 504 that is controllable to generate an output voltage greater than (boost functionality) or equal to (bypass functionality) the input voltage. The output voltage can be provided to, for example, a high-voltage (HV) power amplifier (PA) as a supply voltage. Such an HV PA can include, for example, an HV average power tracking (APT) PA. The voltage supply system 500 can include a boost converter that includes the boost converter circuitry 504, the inductor 521, and the second capacitor 532.

The supply device 502 further includes charge pump circuitry 508 that is controllable to generate an output voltage less than the input voltage. The charge pump circuitry 508 can be configured to generate a low-voltage (LV) output which is shown to be provided to the output node 592 through a bypass circuit 510.

In some embodiments, the charge pump circuitry 508 can operate with the third capacitor 533 (e.g., a flying capacitance) to generate a desired output which can be, for example, twice the input voltage or half the input voltage. An example charge pump that can be utilized as the charge pump is described in U.S. Provisional Application No. 62/116,457, filed Feb. 15, 2015, entitled INTERLEAVED DUAL OUTPUT CHARGE PUMP, and U.S. application Ser. No. 14/861,058, filed Sep. 22, 2015, entitled INTERLEAVED DUAL OUTPUT CHARGE PUMP, the disclosure of each of which is hereby expressly incorporated by reference herein in its entirety.

Figure 6:
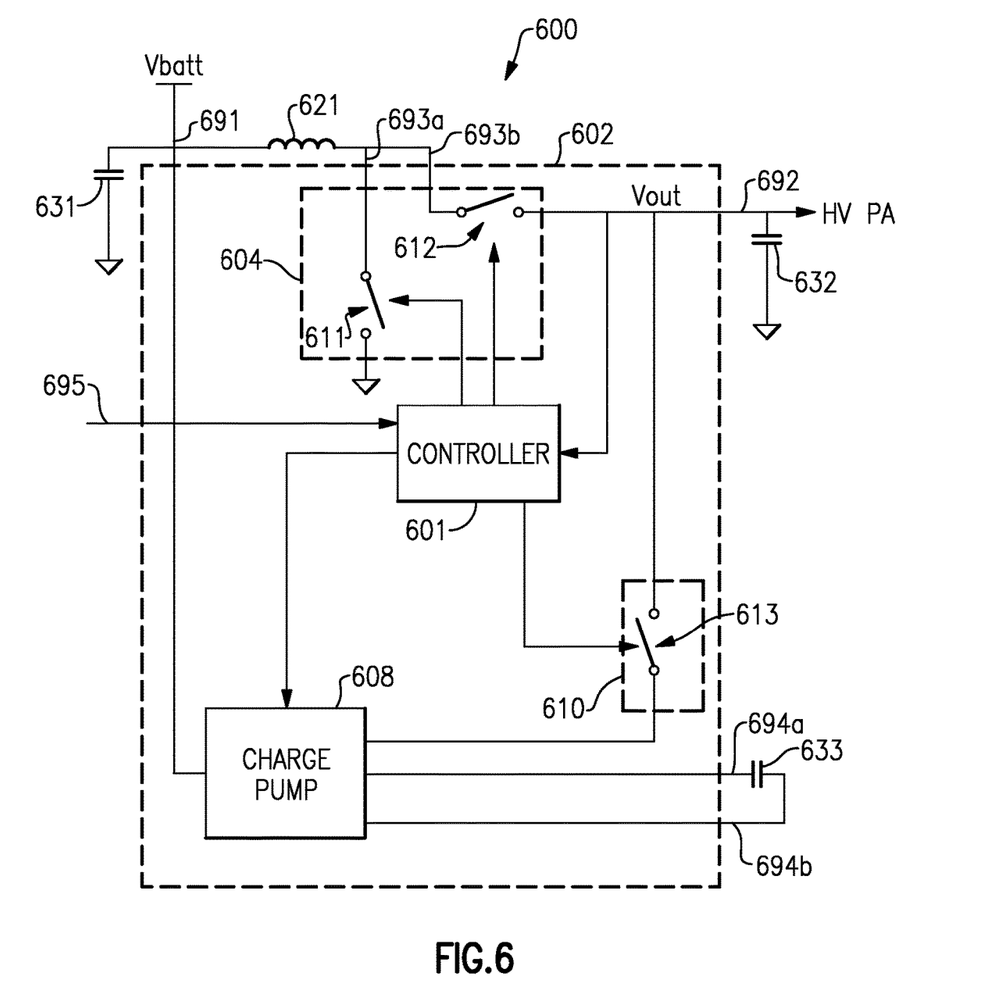
FIG. 6 illustrates a voltage supply system including a plurality of switches.

FIG. 6 illustrates a voltage supply system 600 including a plurality of switches 611-613. The voltage supply system 600 includes a supply device 602 (e.g., a die or a module) including an input node 691 to receive an input voltage (Vbatt) and an output node 692 to supply an output voltage (Vcc). The input node 691 is coupled to a ground voltage via a first capacitor 531 that shunts variations in the input voltage. The output node 692 is coupled to the ground voltage via a second capacitor 632 that shunts variations in the output voltage and implements a capacitor of a boost converter.

The supply device 602 includes two switching nodes 693a-693b coupled, via an inductor 621, to the input voltage. The inductor 621 implements an inductor of the boost converter. The boost converter further includes boost converter circuitry 604 residing on the supply device 602 that includes a first switch 611 coupled between the first switching node 693a and the ground voltage and a second switch 612 coupled between the second switching node 693b and the output node 692.

The first switch 611 and second switch 612 and controllable (e.g., by the controller 601) for the accumulation and transfer of energy associated with the inductor 621 and a capacitor 632 to generate an output voltage at the output node 692 that is greater than the input voltage at the input node 691. Thus, the controller 601 can be configured to periodically operate the switches 611-612 to boost the input voltage to generate the output voltage at the output node 692.

The first switch 611 and second switch 612 are also controllable (e.g., by the controller 601) to provide a bypass functionality by opening the first switch 611 and closing the second switch 612 such that the output voltage at the output node 692 is approximately equal to the input voltage at the input node 691. Thus, the controller 601 can be configured to operate the switches 611-612 to pass the input voltage as the output voltage to the output node.

In some implementations, the supply device 602 includes a bypass circuit (not shown) separate from the boost converter circuitry 604 to pass the input voltage as the output voltage to the output node. For example, in some implementations, the first switch 611 and second switch 612 can be implemented so as to change state rapidly (while performing boost functionality) at the expense of higher switch loss. Thus, the supply device 602 can include a bypass circuit including a slower switch (coupled in series between the input node 691 and the output node 692) that does not change state as rapidly but has lower switch loss than the second switch 612.

The supply device 602 includes two charge pump nodes 694a-694b coupled together via a third capacitor 632 that implements a capacitor of a charge pump. The supply device 602 includes charge pump circuitry 608 that is controllable (e.g., by the controller 601) to generate an output voltage less than the input voltage. In some embodiments, the charge pump circuitry 608 can operate with the third capacitor 633 (e.g., a flying capacitance) to generate a desired output which can be, for example, twice the input voltage or half the input voltage. The output of the charge pump circuitry 608 can be provided to the output node 692 through a bypass circuit 610 including a third switch 613 controllable by the controller 601.

The supply device 602 can include one or more control nodes 695 for receiving one or more control signals. The control node 695 can be coupled to the controller 601 which can receive and process the control signals. Thus, the voltage supply system 600 includes a boost converter controllable (e.g., by the controller 601) to receive an input voltage at the input node 691 and generate an output voltage when the output voltage is greater than (boost functionality) or equal to (bypass functionality) to the input voltage. The boost converter can include the boost control circuitry 604 residing on the supply device 602 and one or more passive devices external to the supply device 602 (e.g., the inductor 621 and the second capacitor 632). The voltage supply system 600 includes a charge pump controllable (e.g., by the controller 601) to receive the input voltage at the input node 691 and generate the output voltage when the output voltage is less than the input voltage. The charge pump can include the charge pump circuitry 608 residing on the supply device 602 and one or more passive devices external to the supply device 602 (e.g., the third capacitor 633). The voltage supply system 600 includes a controller 601 configured to receive a control signal (e.g., via the control node 695) and control the boost converter or the charge pump to generate the output voltage at the output node 692 based on the control signal.

In some implementations, the control signal indicates a mode of operation. The control signal can indicate a mode of operation in a number of ways. In some implementations, the control signal directly indicates one of a plurality of modes. In some implementations, the control signal indicates a target output power that corresponds to one of a plurality of modes. In some implementations, the control signal indicates a target supply voltage that corresponds to one of a plurality of modes.

In response to the control signal indicating a first mode (e.g., a low-voltage mode, a buck mode, or a voltage decrease mode), the controller 601 is configured to control the charge pump (e.g., the charge pump circuitry 608 or one or more switches of the charge pump circuitry 608) to generate the output voltage less than the input voltage. In some implementations, the controller 601 is configured to control the charge pump to generate the output voltage of approximately half the input voltage. In some implementations, when the control signal indicates the first mode, the controller 601 is configured to control the charge pump bypass circuit 610 to pass the output voltage (from the charge pump output) to the output node 692. For example, the controller 601 can be configured to close the third switch 613 in response to the control signal indicating the first mode.

In response to the control signal indicating a second mode (e.g., a medium-voltage mode, a bypass mode, or a voltage equal mode), the controller 601 is configured to control the boost converter to generate the output voltage equal to the input voltage. In some implementations, the controller 601 is configured to operate one or more switches of the boost converter to pass the input voltage as the output voltage to the output node 692. For example, the controller 601 can be configured to open the first switch 611 and close the second switch 612 to pass the input voltage as the output voltage to the output node 692.

As noted above, in some implementations, the supply device 602 includes a bypass circuit (not shown) separate from the boost converter circuitry 604. Thus, in some implementations, in response to the control signal indicating the second mode, the controller 601 is configured to control the bypass circuit to pass the input voltage as the output voltage to the output node 692.

In response to the control signal indicating a third mode (e.g., a high-voltage mode, a boost mode, or a voltage increase mode), the controller is configured to control the boost converter to generate the output voltage greater than the input voltage. In addition to indicating the third mode, the control signal can further indicate a target output voltage. The controller 601 can control the boost converter to boost the input voltage to result in the target output voltage. In some implementations, the controller 601 is configured to periodically operate one or more switches of the boost converter to boost the input voltage to generate the output voltage at the output node 692. For example, the controller 601 can be configured to periodically open and close the first switch 611 and second switch 612 to boost the input voltage to generate the output voltage at the output node 692.

As noted above, the boost converter can include the inductor 621 and one or more switches (e.g., the first switch 611 coupled between the inductor 621 and the ground voltage and the second switch 612 coupled between the inductor 621 and the output node 692). In some implementations, (unlike the converter 200 of FIG. 2), the boost converter does not include a switch coupled between the inductor 621 and the input node 691. In particular, the voltage supply system 600 does not include a switch coupled between the inductor 621 and the input node 691.

The charge pump can include one or more capacitors (e.g., the third capacitor 633). The charge pump can further include one or more switches (e.g., switches of the charge pump circuitry 608). However, in some implementations, the charge pump does not include an inductor.

Table 1 illustrates a state table of the first switch 611 (S1), second switch 612 (S2), and third switch 613 (S3) in response to a control signal indicating a mode. In particular, in response to the control signal indicating a first mode (e.g., a low-voltage mode), the first switch 611 and second switch 612 are off (e.g., open) and the third switch 613 is on (e.g., closed). In response to the control signal indicating a second mode (e.g., a medium-voltage mode), the first switch 611 and third switch 613 are off and the second switch 612 is on. In response to the control signal indicating a third mode (e.g., a high-voltage mode), the third switch 613 is off and the first switch 611 and second switch 612 are operated in a switched mode.

TABLE 1

| Mode | S1 | S2 | S3 |
|---|---|---|---|
| Low-voltage (charge pump) | OFF | OFF | ON |
| Medium-voltage (bypass) | OFF | ON | OFF |
| High-voltage (boost converter) | Switched mode | Switched mode | OFF |

Figure 7:
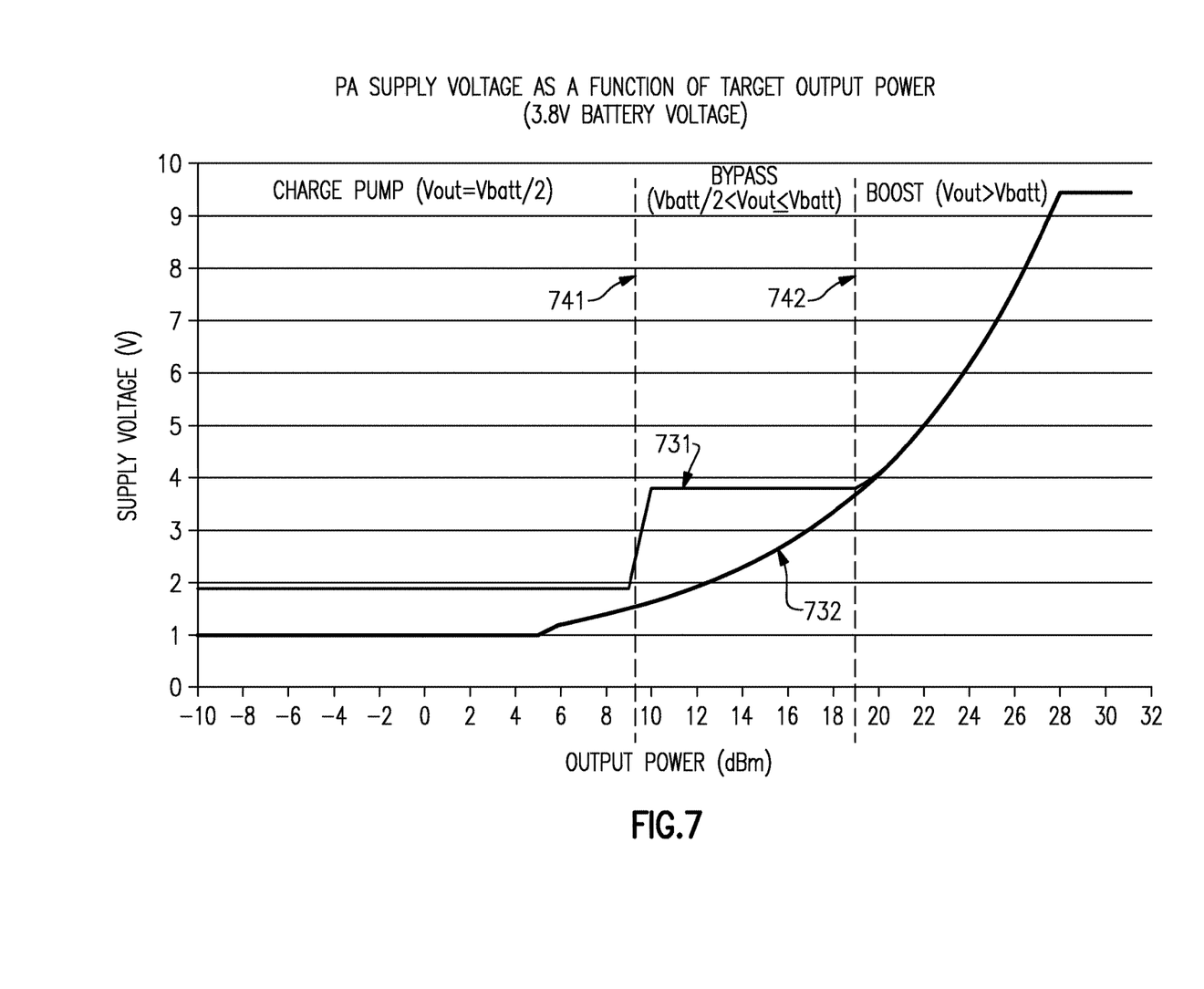
FIG. 7 illustrates a graph of supply voltage versus output power of a power amplifier receiving the supply voltage.

FIG. 7 illustrates a graph of supply voltage versus output power of a power amplifier receiving the supply voltage. The curve indicated as 732 is an example ideal supply voltage profile that can be utilized to yield a range of PA output power. The curve indicated as 731 is an example of the multiple output voltages that can be obtained from a voltage supply system, e.g., the voltage supply system 600 of FIG. 6. For the purpose of description, it will be assumed that the input voltage is substantially equal to a battery voltage of 3.8 V.

When a low-power PA output is desired (e.g., a target output power below a first threshold 741) and the control signal indicates a first mode, a low-voltage output (e.g., Vbatt/2≈1.9V) can be generated by the voltage supply system 600 utilizing the charge pump. When a medium-power PA output is desired (e.g., a target output power between the first threshold 741 and the second threshold 742) and the control signal indicates a second mode, a medium-voltage output (e.g., Vbatt) can be generated by the voltage supply system 600 utilizing the boost converter as a bypass circuit (or by utilizing a separate bypass circuit) When a high-power PA output is desired (e.g, a target output voltage above the second threshold 742) and the control signal indicates a third mode, a high-voltage output can be generated by the voltage supply system 600 utilizing the boost converter.

Figure 8:
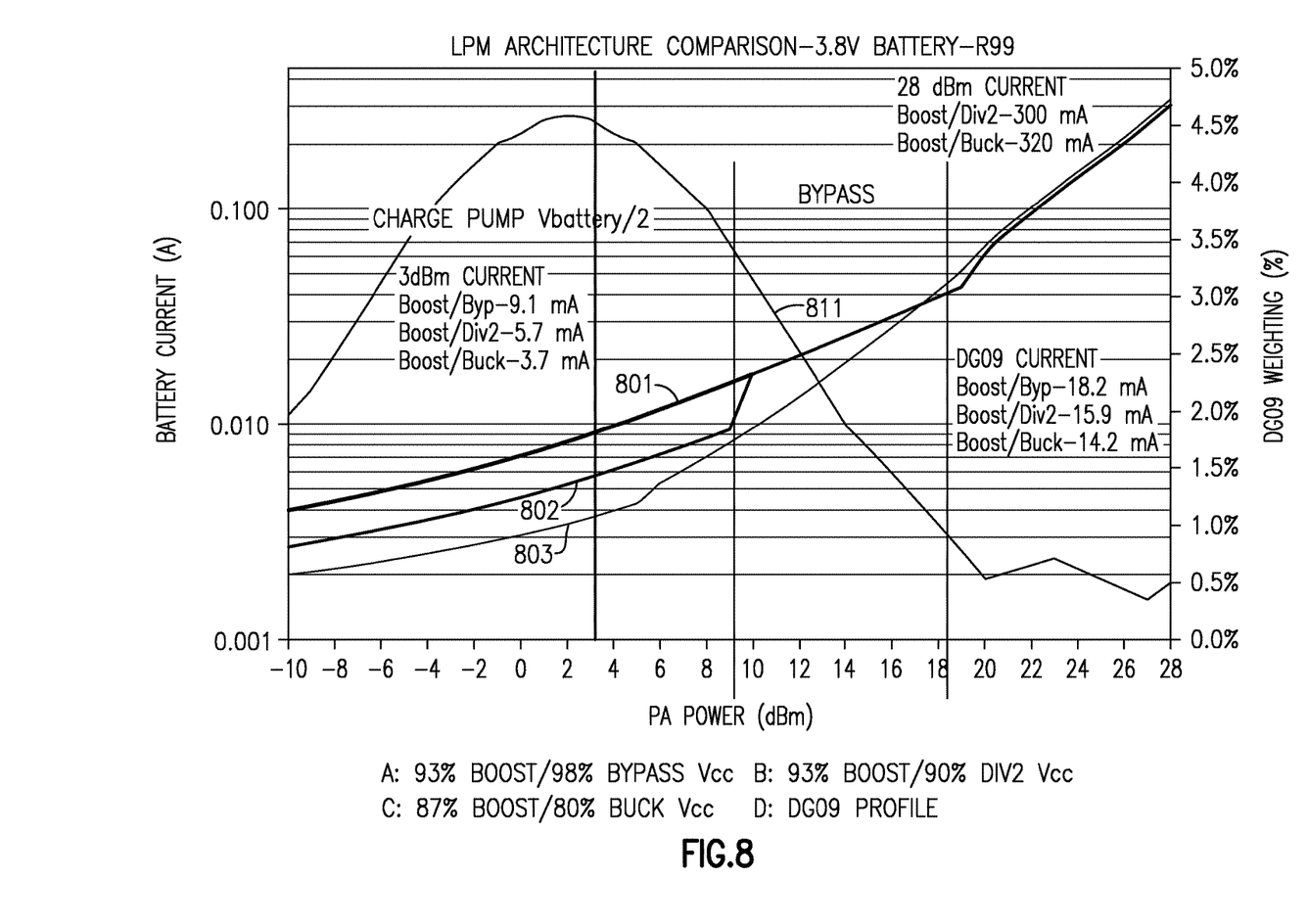
FIG. 8 illustrates graphs of battery current profiles as a function of PA power and further illustrates a DG09 profile.

FIG. 8 illustrates graphs of battery current profiles 801-803 as a function of PA power and further illustrates a DG09 profile 811. The DG09 profile 811 indicates a likelihood of use at a particular PA power. Thus, typical battery usage is a function of the current drawn, weighted by the DG09 profile, and integrated over PA power.

The first battery current profile 801 illustrates a boost/bypass combination (e.g., using the converter 300 of FIG. 3), current profile 802 illustrates a boost/charge-pump (divide-by-2) combination (e.g., using the voltage supply system 600 of FIG. 6), and current profile 803 illustrates a boost/buck combination (e.g., using the converter 200 of FIG. 2). At a notable rated power condition of 28 dBm condition, one can see that the boost/charge-pump (divide-by-2) combination as described herein results in current savings of about 20 mA, while degrading DG09 by only about 1.7 mA.

The current profile 802 illustrates that the boost/charge-pump combination outperforms the boost/buck combination at high PA power (due to the lack of switching loss from the switch coupled between the input node and the inductor). The current profile 802 illustrates that the boost/charge-pump combination outperforms the boost/bypass combination at lower PA power (due to use of a charge pump to lower the input voltage).

Figure 9:
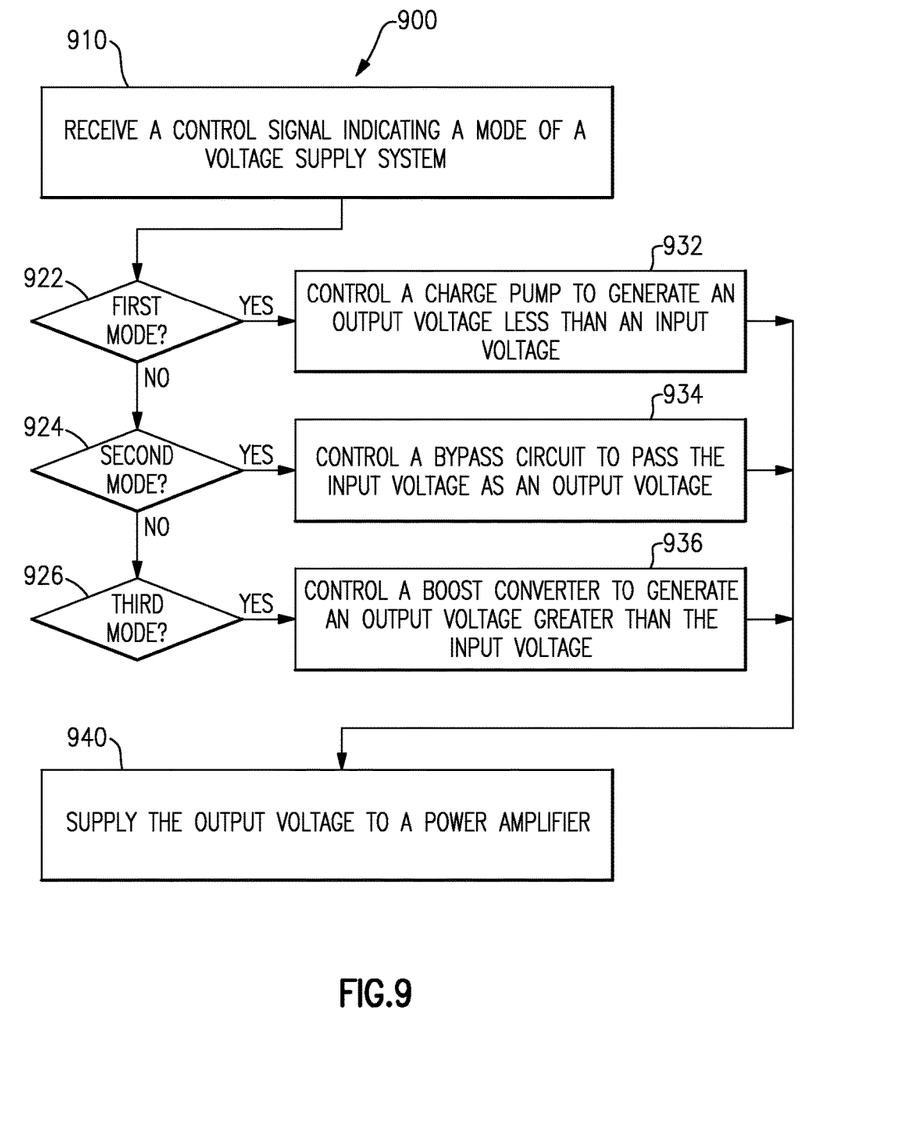
FIG. 9 illustrates a flowchart representation of a method of operating a voltage supply system.

FIG. 9 illustrates a flowchart representation of a method of operating a voltage supply system. In some implementations (and as detailed below as an example), the method 900 is at least partially performed by a controller, such as the controller 601 of FIG. 6. In some implementations, the method 900 is at least partially performed by processing logic, including hardware, firmware, software, or a combination thereof. In some implementations, the method 900 is at least partially performed by a processor executing code stored in a non-transitory computer-readable medium (e.g., a memory).

The method 900 begins, at block 910, with the controller receiving a control signal indicative of one or more modes of a voltage supply system. Depending on the result of decision blocks 922 (first mode?), 924 (second mode?) or 926 (third mode?), the voltage supply system can be configured appropriately. If the control signal indicates the first mode, the controller, in block 932, can control a charge pump to generate an output voltage less than an input voltage. The controller can further control a charge pump bypass circuit to couple the output voltage to an output mode. If the control signal indicates the second mode, the controller, in block 934, can control a bypass circuit to pass the input voltage as the output voltage to the output node. If the control signal indicates the third mode, the controller, in block 936, can control a boost converter to generate an output voltage greater than the input voltage. In some implementations, the bypass circuit is part of the boost controller. In some implementations, the control signal indicates a target output voltage and the control controls the boost converter to generate the target output voltage.

At block 940, the controller 940 can control the voltage supply system to supply the output voltage to a power amplifier.

Figure 10:
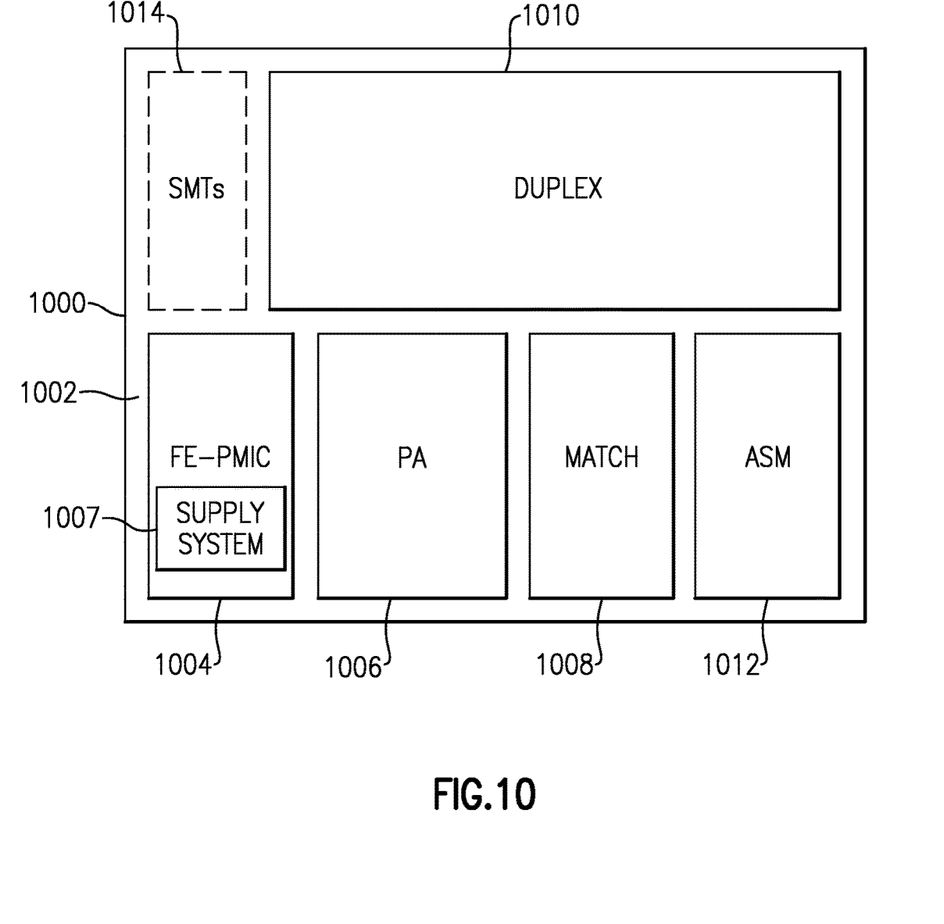
FIG. 10 depicts a module having one or more features as described herein.

FIG. 10 shows that in some embodiments, some or all of the voltage supply system having one or more features as described herein (e.g., the configurations of FIGS. 2-6) can be implemented in a module. Such a module can be, for example, a front-end module (FEM). In the example of FIG. 10, a module 1000 can include a packaging substrate 1002, and a number of components can be mounted on such a packaging substrate. For example, an FE-PMIC (front-end power management integrated circuit) component 1004, a power amplifier assembly 1006, a match component 1008, and a duplexer assembly 1010 can be mounted and/or implemented on and/or within the packaging substrate 1002. Other components such as a number of SMT devices 1014 (such as the passive devices 410 of FIG. 4 and/or the inductors and/or capacitors of FIGS. 5 and 6) and an antenna switch module (ASM) 1012 can also be mounted on the packaging substrate 1002. Although all of the various components are depicted as being laid out on the packaging substrate 1002, it will be understood that some component (s) can be implemented over other component(s). In some embodiments, a voltage supply system 1007 having one or more features as described herein can be implemented as a part of the FE-PMIC component 1004.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 11:
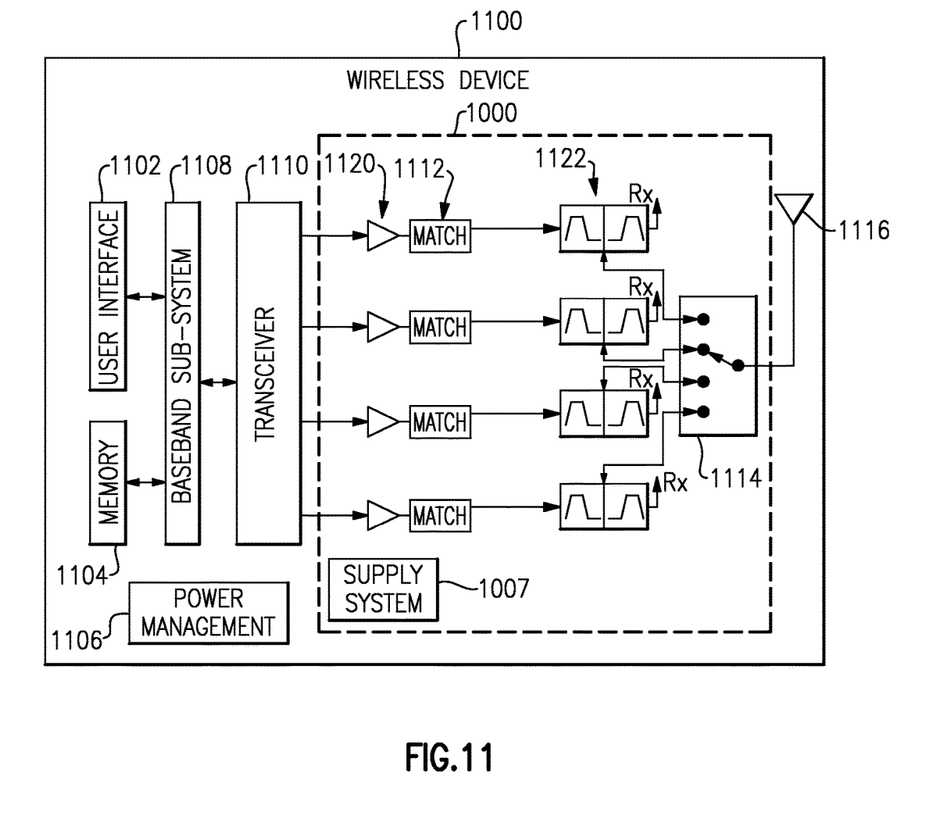
FIG. 11 depicts a wireless device having one or more features described herein.

FIG. 11 depicts an example wireless device 1100 having one or more advantageous features described herein. In the context of a module having one or more features as described herein, such a module can be generally depicted by a dashed box 1000, and can be implemented as, for example, a front-end module (FEM).

Referring to FIG. 11, power amplifiers (PAs) 1120 can receive their respective RF signals from a transceiver 1110 that can be configured and operated in known manners to generate RF signals to be amplified and transmitted, and to process received signals. The transceiver 1110 is shown to interact with a baseband sub-system 1108 that is configured to provide conversion between data and/or voice signals suitable for a user and RF signals suitable for the transceiver 1110. The transceiver 1110 can also be in communication with a power management component 1106 that is configured to manage power for the operation of the wireless device 400. Such power management can also control operations of the baseband sub-system 1108 and the module 1000.

The baseband sub-system 1108 is shown to be connected to a user interface 1102 to facilitate various input and output of voice and/or data provided to and received from the user. The baseband sub-system 1108 can also be connected to a memory 1104 that is configured to store data and/or instructions to facilitate the operation of the wireless device, and/or to provide storage of information for the user.

In the example wireless device 1100, outputs of the PAs 1120 are shown to be matched (via respective match circuits 1112) and routed to their respective duplexers 1122. Such amplified and filtered signals can be routed to an antenna 1116 through an antenna switch 1114 for transmission. In some embodiments, the duplexers 1122 can allow transmit and receive operations to be performed simultaneously using a common antenna (e.g., 1116). In FIG. 11, received signals are shown to be routed to "Rx" paths (not shown) that can include, for example, a low-noise amplifier (LNA).

In some embodiments, a voltage supply system 1007 as described herein can be implemented as a part of the module 1000.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A voltage supply system comprising:
   a boost converter controllable to receive an input voltage at an input node and generate an output voltage when the output voltage is greater than or equal to the input voltage, the boost converter including an inductor and one or more switches but no switch coupled between the inductor and the input node;
   a charge pump controllable to receive the input voltage at the input node and generate the output voltage when the output voltage is less than the input voltage; and
   a controller configured to receive a control signal and control the boost converter or the charge pump to generate the output voltage at an output node based on the control signal.

2. The voltage supply system of claim 1 wherein, in response to the control signal indicating a first mode, the controller is configured to control the charge pump to generate the output voltage less than the input voltage.

3. The voltage supply system of claim 2 wherein, in response to the control signal indicating the first mode, the controller is configured to control the charge pump to generate the output voltage of approximately half the input voltage.

4. The voltage supply system of claim 2 wherein, in response to the control signal indicating the first mode, the controller is configured to control a charge pump bypass circuit to pass the output voltage to the output node.

5. The voltage supply system of claim 1 wherein, in response to the control signal indicating a second mode, the controller is configured to control the boost converter to generate the output voltage equal to the input voltage.

6. The voltage supply system of claim 5 wherein, in response to the control signal indicating the second mode, the controller is configured to operate one or more switches of the boost converter to pass the input voltage as the output voltage to the output node.

7. The voltage supply system of claim 1 wherein, in response to the control signal indicating a third mode, the controller is configured to control the boost converter to generate the output voltage greater than the input voltage.

8. The voltage supply system of claim 7 wherein, in response to the control signal indicating the third mode, the controller is configured to periodically operate one or more switches of the boost converter to boost the input voltage to generate the output voltage at the output node.

9. The voltage supply system of claim 1 wherein the one or more switches includes a first switch coupled between the inductor and a ground voltage and a second switch coupled between the inductor and the output node.

10. The voltage supply system of claim 9 wherein, in response to the control signal indicating a second mode, the controller is configured to open the first switch and close the second switch to pass the input voltage as the output voltage to the output node.

11. The voltage supply system of claim 9 wherein, in response to the control signal indicating a third mode, the controller is configured to periodically open and close the first switch and second switch to boost the input voltage to generate the output voltage at the output node.

12. The voltage supply system of claim 1 wherein the charge pump includes one or more capacitors.

13. The voltage supply system of claim 12 wherein the charge pump does not include an inductor.

14. The voltage supply system of claim 1 wherein the input voltage is substantially equal to a battery voltage.

15. A radio-frequency (RF) module comprising:
a packaging substrate configured to receive a plurality of components; and
a voltage supply system implemented on the packaging substrate, the voltage supply system including a boost converter controllable to receive an input voltage at an input node and generate an output voltage when the output voltage is greater than or equal to the input voltage, the boost converter including an inductor and one or more switches but no switch coupled between the inductor and the input node, a charge pump controllable to receive the input voltage at the input node and generate the output voltage when the output voltage is less than the input voltage, and a controller configured to control the boost converter or the charge pump to generate the output voltage at an output node based on a received control signal.

16. The RF module of claim 15 wherein the RF module is a front-end module (FEM).

17. The RF module of claim 15 wherein the voltage supply system includes a supply device and one or more passive devices external to and electrically connected to the supply device.

18. A wireless device comprising:
a transceiver configured to generate a radio-frequency (RF) signal;
a front-end module (FEM) in communication with the transceiver, the FEM including a packaging substrate configured to receive a plurality of components and a power amplification system implemented on the packaging substrate and configured to amplify the RF signal, the power amplification system including a voltage supply system, the voltage supply system including a boost converter controllable to receive an input voltage at an input node and generate an output voltage when the output voltage is greater than or equal to the input voltage, the boost converter including an inductor and one or more switches but no switch coupled between the inductor and the input node, a charge pump controllable to receive the input voltage at the input node and generate the output voltage when the output voltage is less than the input voltage, and a controller configured to control the boost converter or the charge pump to generate the output voltage at an output node based on a received control signal; and
an antenna in communication with the FEM, the antenna configured to transmit the amplified RF signal.

19. The wireless device of claim 18 wherein, in response to the control signal indicating a first mode, the controller is configured to control a charge pump bypass circuit to pass the output voltage to the output node.

20. The wireless device of claim 18 wherein, in response to the control signal indicating a second mode, the controller is configured to operate one or more switches of the boost converter to pass the input voltage as the output voltage to the output node.

* * * * *